(12) United States Patent
Hiraiwa et al.

(10) Patent No.: US 7,441,145 B2
(45) Date of Patent: Oct. 21, 2008

(54) FAILURE MONITORING FOR STORAGE SYSTEMS CONSTITUTING MULTIPLE STAGES

(75) Inventors: Yuri Hiraiwa, Sagamihara (JP); Nobuhiro Maki, Sagamihara (JP); Katsuhisa Miyata, Yokohama (JP); Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 756 days.

(21) Appl. No.: 10/964,761

(22) Filed: Oct. 15, 2004

(65) Prior Publication Data

US 2006/0031709 A1 Feb. 9, 2006

(30) Foreign Application Priority Data

Aug. 9, 2004 (JP) .............................. 2004-232042

(51) Int. Cl.
*G06F 11/00* (2006.01)

(52) U.S. Cl. ............................... 714/6; 714/20; 714/42; 714/43

(58) Field of Classification Search ...................... 714/6, 714/20, 42, 43
See application file for complete search history.

(56) References Cited

U.S. PATENT DOCUMENTS

| 6,173,377 | B1 * | 1/2001 | Yanai et al. ................. 711/162 |
|---|---|---|---|
| 6,529,944 | B1 | 3/2003 | LeCrone |
| 6,823,349 | B1 * | 11/2004 | Taylor et al. ................. 707/204 |
| 7,013,372 | B2 * | 3/2006 | Achiwa et al. ............... 711/162 |
| 7,100,070 | B2 * | 8/2006 | Iwamura et al. ................. 714/4 |
| 7,219,201 | B2 * | 5/2007 | Kasako et al. ............... 711/162 |
| 7,272,693 | B2 * | 9/2007 | Ushijima et al. ............. 711/162 |
| 7,313,578 | B2 * | 12/2007 | Gagne et al. ................. 707/204 |
| 2001/0037473 | A1 * | 11/2001 | Matsuura et al. ............... 714/5 |
| 2002/0095489 | A1 | 7/2002 | Yamagami |
| 2003/0065841 | A1 * | 4/2003 | Pecone ........................ 710/105 |
| 2003/0126107 | A1 * | 7/2003 | Yamagami ..................... 707/1 |
| 2003/0147408 | A1 * | 8/2003 | Datta et al. .................. 370/401 |
| 2003/0177321 | A1 * | 9/2003 | Watanabe .................... 711/161 |
| 2003/0191916 | A1 * | 10/2003 | McBrearty et al. .......... 711/162 |
| 2003/0229764 | A1 | 12/2003 | Ohno et al. |
| 2004/0078644 | A1 * | 4/2004 | Fujibayashi et al. ............. 714/6 |
| 2004/0153753 | A1 * | 8/2004 | Yamaguchi et al. ........... 714/13 |
| 2004/0260902 | A1 * | 12/2004 | Stanley et al. ............... 711/165 |
| 2005/0081091 | A1 * | 4/2005 | Bartfai et al. .................. 714/6 |
| 2006/0123212 | A1 * | 6/2006 | Yagawa ...................... 711/162 |

* cited by examiner

*Primary Examiner*—Scott T. Baderman
*Assistant Examiner*—Loan Truong
(74) *Attorney, Agent, or Firm*—Antonelli, Terry, Stout & Kraus, LLP.

(57) ABSTRACT

To provide a computer system capable of detecting a failure at an early stage while keeping down an increase in I/O load due to failure monitoring. The computer system includes plural storage systems connected in stages between a first computer and a second computer. The first computer sends control I/O to the storage systems. The second computer monitors control I/O transferred through the storage systems; and when there is control I/O that has not been transferred successfully, requests state information of the storage systems to transfer the control I/O.

9 Claims, 11 Drawing Sheets

COPY GROUP DEFINITION INFORMATION

| | | 130 |
|---|---|---|
| 131 | COPY GROUP NUMBER | 01 |
| 132 | DUPLICATION PROCESSING TYPE IDENTIFIER | ASYNCHRONOUS COPY |
| 133 | UPPER STAGE GROUP NUMBER | NONE |
| 134 | LOWER STAGE GROUP NUMBER | 02 |
| 135 | ASSOCIATED FLAG | ASSOCIATED |
| 140 | PAIR INFORMATION | |
| | PAIR INFORMATION | |

⋮

PAIR INFORMATION 140

| | | |
|---|---|---|
| 141 | COPY SOURCE VOLUME NUMBER | 01 |
| 142 | COPY SOURCE STORAGE SYSTEM NUMBER | 1 |
| 143 | COPY SOURCE VOLSER | VOL010 |
| 144 | COPY DESTINATION VOLUME NUMBER | 11 |
| 145 | COPY DESTINATION DISK DEVICE NUMBER | 5 |
| 146 | COPY DESTINATION VOLSER | VOL003 |

FIG.4

COPY GROUP ASSOCIATION DEFINITION INFORMATION 150

| | |
|---|---|
| EXTENDED COPY GROUP NUMBER | 01 |
| FIRST COPY GROUP NUMBER | 01 |
| SECOND COPY GROUP NUMBER | 05 |

FIG.5

CONTROL I/O ISSUING PARAMETER ←111

| RECIPIENT EXTENDED GROUP NUMBER | ISSUE INTERVAL INFORMATION |
|---|---|
| 01 | 1 SECOND |
| 09 | 10 SECONDS |

FIG. 6

STORAGE SYSTEM CONFIGURATION INFORMATION

| SITE IDENTIFIER "PRIMARY" | |
|---|---|
| STORAGE SYSTEM NUMBER 1 | |
| VOLUME NUMBER 01 | VOLSER VOL010 |
| VOLUME NUMBER 02 | VOLSER VOL001 |
| VOLUME NUMBER 03 | VOLSER VOL005 |
| STORAGE SYSTEM NUMBER 2 | |
| VOLUME NUMBER 05 | VOLSER VOL007 |
| VOLUME NUMBER 06 | VOLSER VOL008 |
| VOLUME NUMBER 07 | VOLSER VOL009 |
| SITE IDENTIFIER "LOCAL" | |
| STORAGE SYSTEM NUMBER 5 | |
| VOLUME NUMBER 11 | VOLSER VOL003 |

- 160
- 161 (STORAGE SYSTEM NUMBER 1 volumes)
- 162 (STORAGE SYSTEM NUMBER 2 volumes)
- 163 (SITE IDENTIFIER "LOCAL" group)

FAILURE MONITORING FOR STORAGE SYSTEMS CONSTITUTING MULTIPLE STAGES

CLAIM OF PRIORITY

The present application claims priority from Japanese application P2004-232042 filed on Aug. 9, 2004, the content of which is hereby incorporated by reference into this application.

BACKGROUND

This invention relates to a computer system which has remote copying technology, and more specifically to a technique of monitoring a failure in a computer system.

In recent years, computer systems of late handle larger size data and more frequent data update than ever. How to backup such data is one of important matters in storage technology, along with how quickly a computer system can recover from a failure to resume normal operation. Remote copy is one solution in which plural storage subsystems (external storage systems) having magnetic disk arrays are set up in remote sites and connected by communication paths and data updated in one of the storage subsystems is automatically copied to the other storage subsystems without the help of a host computer (refer to JP 2004-13367 A).

Another solution proposed is a failure checking method which uses a system composed of a first host group; a second host group linked via a network to the first host group; and a remote mirror that is incorporated in the first host group and the second host group and that is composed of a first site heartbeat storage volume and a second site heartbeat storage volume linked via a remote link to the first site heartbeat storage volume, and in which the first host group creates a heartbeat signal and uses the network or the remote mirror, or both, to sent the heartbeat signal to the second host group, and the second host takes over operation of the system upon receiving an incorrect heartbeat signal from the first host group (refer to JP 2002-312189 A).

Also proposed is a technique in which a first storage subsystem connected to a host computer via a communication path receives, from the host computer, a control command for a volume pair in another storage subsystem and transfers the control command to the corresponding storage subsystem, which sends a response to the control command to the host computer via the first storage subsystem. The technique enables the host computer to receive a response from a remote-level storage subsystem which is not connected directly to the host computer via a communication path (refer to U.S. Pat. No. 6,529,944 B).

SUMMARY

When heartbeat signals are sent to storage systems at short intervals in order to monitor the storage systems, the load of a server monitoring the storage systems is great causing a delay in normal I/O processing. On the other hand, when the transmission interval of heartbeat signals is lengthened for reduction of a load by heartbeat signals, it could delay detection of a failure.

In the case where a server uses a control command to obtain the state of volumes in storage subsystems and the state of an inter-volume pair for failure detection as in U.S. Pat. No. 6,529,944 B, sending the server a response from each storage subsystem is a heavy load on the storage system.

It is therefore an object of this invention to provide a computer system capable of detecting a failure at an early stage while keeping down an increase in I/O load due to failure monitoring.

A computer system including plural storage systems connected in stages between a first computer and a second computer. The first computer sends control I/O to the storage systems; and the second computer monitors control I/O transferred through the storage systems; and when there is control I/O that has not been transferred successfully, requests state information of the storage systems to transfer the control I/O.

According to this invention, a storage system can be monitored for a failure without increasing the load on a server.

BRIEF DESCRIPTION OF THE DRAWINGS

The present invention can be appreciated by the description which follows in conjunction with the following figures, wherein:

FIG. 4 is a configuration diagram of pair information according to the first embodiment of this invention.

FIG. 5 is a configuration diagram of copy group association definition information according to the first embodiment of this invention.

FIG. 6 is a configuration diagram of a control I/O issuing parameter according to the first embodiment of this invention.

FIG. 7 is a configuration diagram of storage system configuration information according to the first embodiment of this invention.

DETAILED DESCRIPTION OF THE PREFERRED EMBODIMENTS

Embodiments of this invention will be described below with reference to the accompanying drawings.

Figure 1:
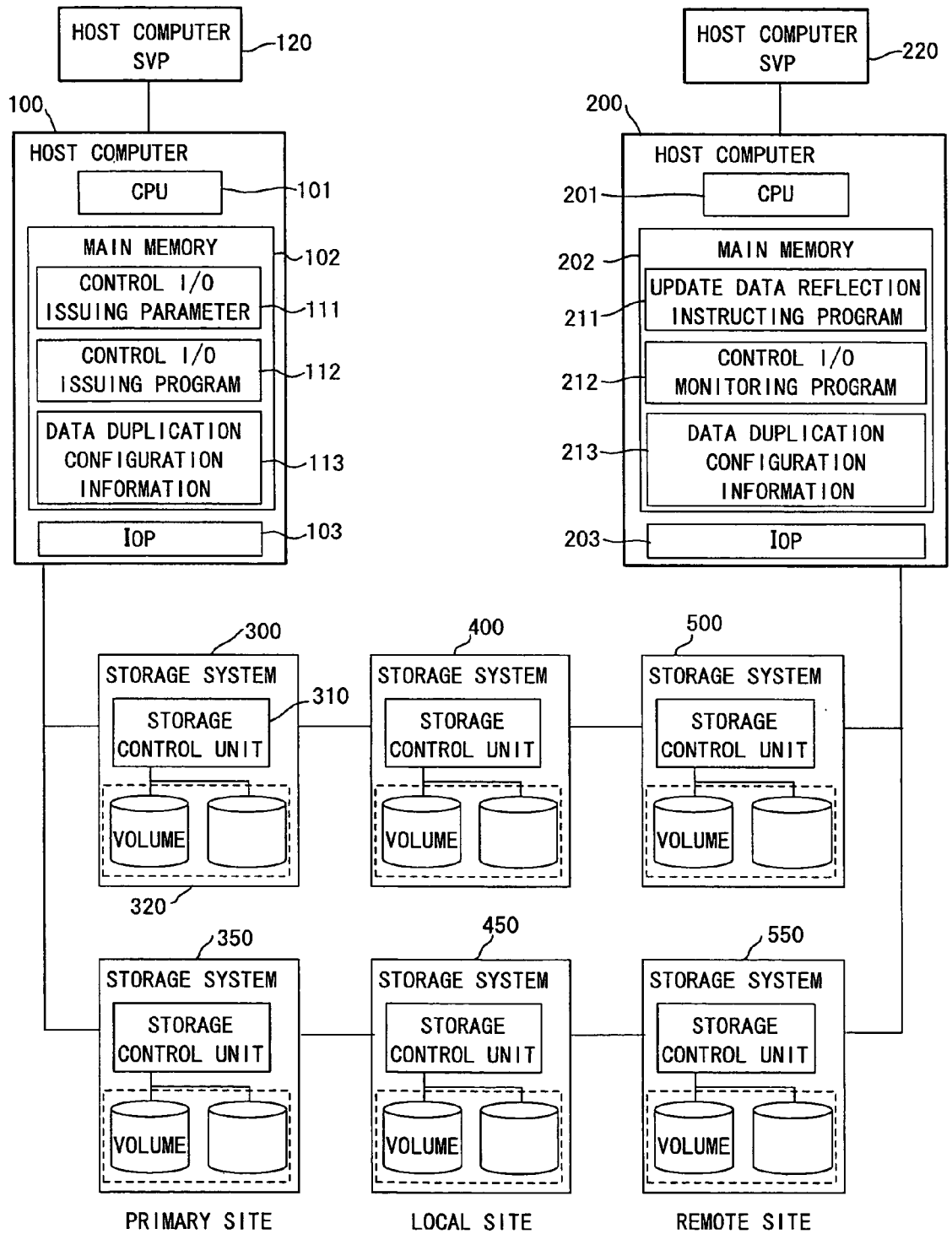
FIG. 1 is a block diagram of a computer system according to a first embodiment of this invention.

FIG. 1 is a block diagram showing a configuration of a computer system according to a first embodiment of this invention.

The computer system of the first embodiment is composed of host computers 100 and 200 and storage systems 300, 350, 400, 450, 500 and 550.

The host computer 100 is a computer device which is provided with a CPU 101, a memory, an input/output device, a main memory 102, and an input/output processing device (IOP) 103. The host computer 200 has a configuration similar to that of the host computer 100.

Figures 2, 3:
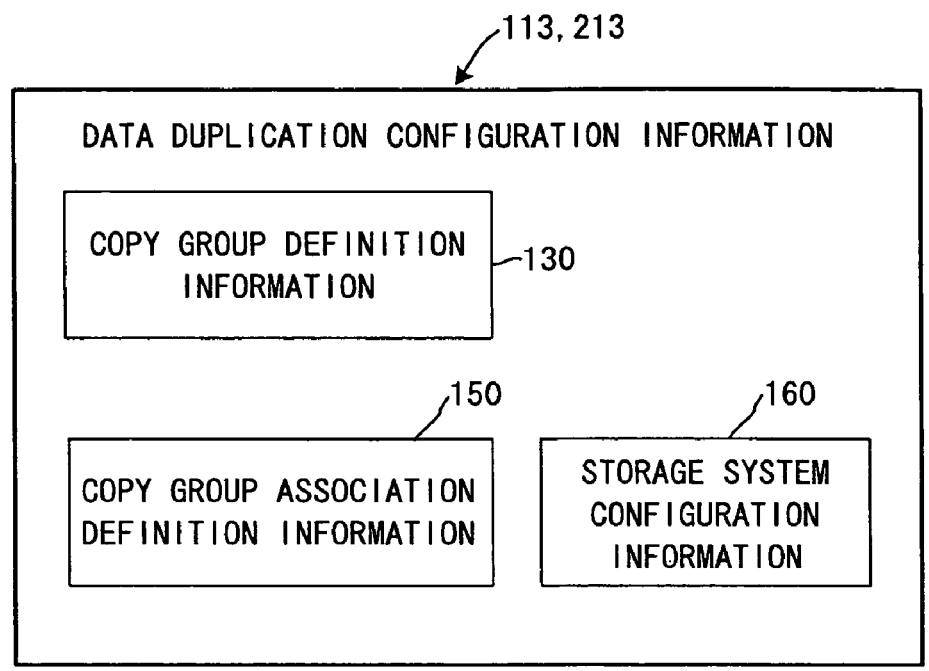
FIG. 2 is a configuration diagram of data duplication configuration information according to the first embodiment of this invention.
FIG. 3 is a configuration diagram of copy group definition information according to the first embodiment of this invention.

The main memory 102 of the host computer (primary host) 100 stores a control I/O issuing parameter 111, a control I/O issuing program 112, and data duplication configuration information 113, which is shown in FIG. 2. The control I/O issuing program 112 is executed by the CPU 101 and issues control I/O (e.g., heartbeat I/O) for failure detection to the storage systems 300 and 350.

Figure 9:
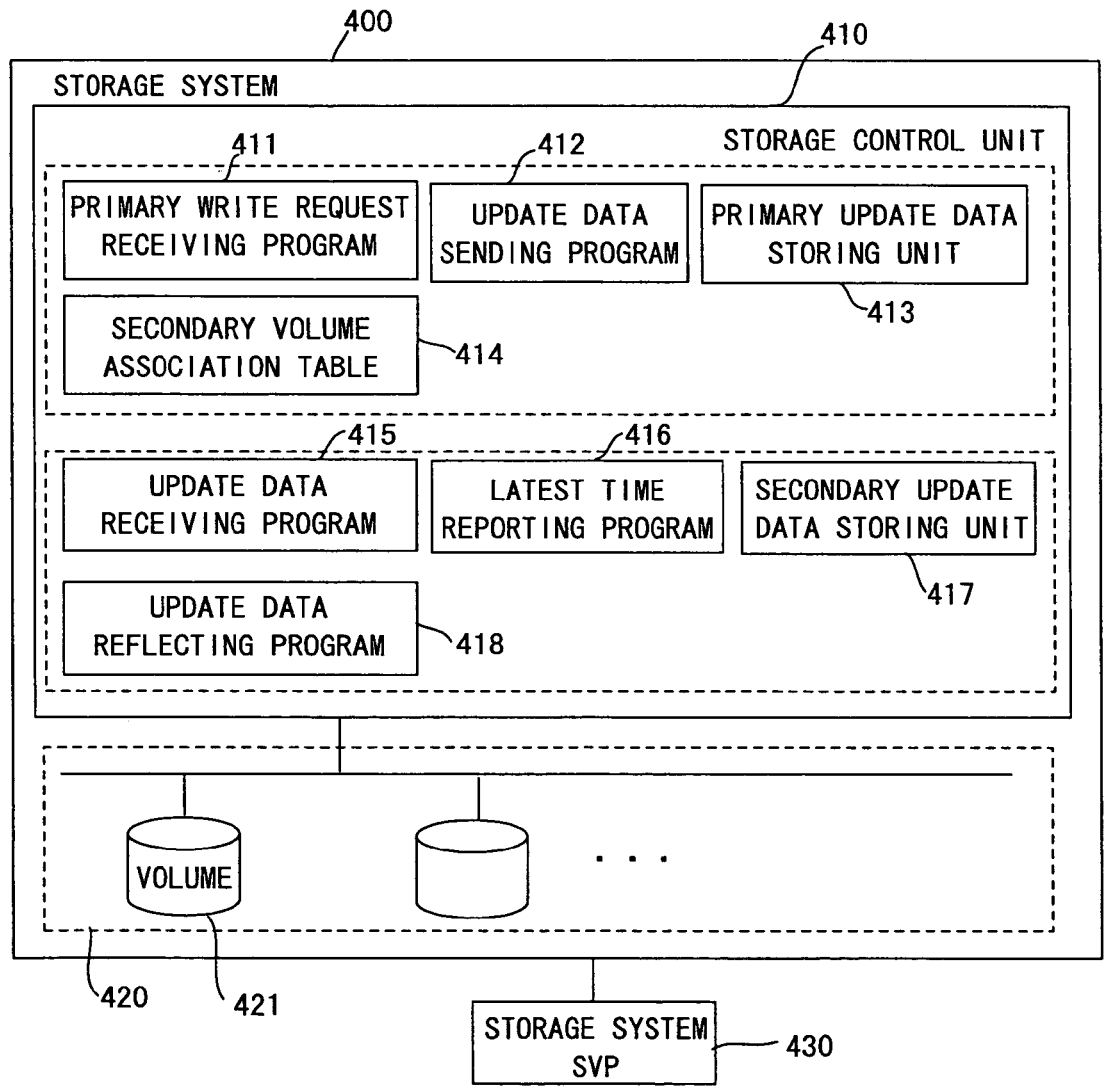
FIG. 9 is a block diagram of a storage system according to the first embodiment of this invention.

A main memory 202 of the host computer (secondary host) 200 stores an update data reflection instructing program 211, a control I/O monitoring program 212, and data duplication configuration information 213, which is shown in FIG. 2. The update data reflection instructing program 211 is executed by a CPU 201 and instructs an update data reflecting program 418, which is shown in FIG. 9, to delete update data contained in a secondary update data storing unit 417, which is shown in FIG. 9. The control I/O monitoring program 212 is executed by the CPU 201, and receives control I/O issued by the control I/O issuing program 112 to monitor the storage systems 300, 400, 500, and others for a failure for each control I/O transfer path.

The host computers 100 and 200 have service processors (SVPs) 120 and 220, respectively. SVP is maintenance terminals to monitor the operation of the computer system.

The storage systems 300 and 350 are set up in a primary site, and are connected to the host computer 100 to exchange data with the host computer 100. The storage system 300 is provided with a storage control unit 310 and a disk array 320, with the storage control unit 310 controlling data input/output for the disk array 320. The storage system 350 has a structure similar to that of the storage system 300.

The storage systems 400 and 450 are set up in a local site relatively close to the primary site. The storage system 400 is connected to the storage system 300, and receives data transferred from the storage system 300. The storage system 450 is connected to the storage system 350, and receives data transferred from the storage system 350. Data stored in the storage systems 300 and 350 in the primary site is copied through data transfer to the storage systems 400 and 450 in the local site at relatively short intervals. The storage systems 400 and 450 have a configuration similar to that of the storage system 300.

The storage systems 500 and 550 are set up in a remote site far from the primary site. The storage system 500 is connected to the storage system 400, and receives data transferred from the storage system 400. The storage system 550 is connected to the storage system 450, and receives data transferred from the storage system 450. Data stored in the storage systems 400 and 450 in the local site is copied through data transfer to the storage systems 500 and 550 in the remote site at relatively long intervals (longer than the interval at which data is remote-copied from the primary site to the local site). The storage systems 500 and 550 have a configuration similar to that of the storage system 300.

The primary site, the local site, and the remote site are thus coupled in a cascading manner via plural transmission paths forming multiple stages and making remote copy from the primary site to the local site and remote copy from the local site to the remote site possible. Desirably, storage systems on the same transmission path have the same configuration, while storage systems on different transmission paths may have different configurations.

Remote copy in this embodiment can either be asynchronous copy or synchronous copy, but it is desirable to employ synchronous copy for remote copy from the primary site to the local site and asynchronous copy for remote copy from the local site to the remote site.

Although the storage systems shown in FIG. 1 are connected in three stages via two paths in a cascading manner, the number of paths and the number of stages may vary.

Whether a control I/O signal sent from the host computer 100 (control I/O issuing program 112) is received by the host computer 200 (control I/O monitoring program 212) through the storage systems 300, 400, and 500 is monitored. Similarly, whether a control I/O signal sent from the host computer 100 (control I/O issuing program 112) is received by the host computer 200 (control I/O monitoring program 212) through the storage systems 350, 450, and 550 is monitored.

When the control I/O is not received upon issuing of the control I/O, it is judged that a failure has occurred in the data transmission path (transmission line or switch) or in a storage system on this transmission path. When the host computer 100 issues control I/O to volumes in the same extended copy group simultaneously and the control I/O is not received through one of the transmission paths by the host computer 200 (control I/O monitoring program 212), it is judged that a failure has occurred in this data transmission path or in a storage system on this data transmission path.

FIG. 2 is a configuration diagram showing data duplication configuration information according to the first embodiment.

Data duplication configuration information 113 and 213 are stored in the main memories of the host computers 100 and 200, respectively. Each of the data duplication configuration information contains copy group definition information 130, which is shown in FIG. 3, copy group association definition information 150, which is shown in FIG. 5, and storage system configuration information 160, which is shown in FIG. 7.

FIG. 3 is a configuration diagram of copy group definition information according to the first embodiment.

The copy group definition information 130 contains a copy group number 131, a duplication processing type identifier 132, an upper stage group number 133, a lower stage group number 134, an associated/unassociated flag 135, and pair information 140, which is shown in FIG. 4.

The copy group number 131 is a number designated to a copy group which is an aggregation of volumes paired by a user. Each copy group is composed of volumes in two storage systems which form a pair.

The duplication processing type identifier 132 shows the copy type employed by a copy group. The identifier shows either synchronous copy or asynchronous copy since this embodiment allows either of the two copy types.

The upper stage group number 133 and the lower stage group number 134 show the cascade configuration of copy groups (storage systems). Specifically, the upper stage group number 133 is the number designated to the copy group from which data is copied to the copy group defined by this copy group definition information. "None" in the field for the upper stage group number 133 means that there is no upper stage storage system from which data is copied to this copy group and that data is written directly from the host computer in a volume from which a copy is to be made to its paired volume according to the pair information of this copy group. The lower stage group number 134 is the number designated to the backup copy group of the copy group defined by this copy group definition information. "None" in the field for the lower stage group number 134 means that there is no lower stage storage system to which data of this copy group is copied and that the storage system in this copy group is at the end of the transmission path.

The associated/unassociated flag shows whether the copy group defined by this copy group definition information belongs to an extended copy group.

FIG. 4 is a configuration diagram of pair information according to the first embodiment.

The pair information 140 shows the relation between a volume from which data is copied and a volume to which the data is copied. The pair information 140 contains a copy source volume number 141, a copy source storage system number 142, a copy source volume serial number 143, a copy destination volume number 144, a copy destination storage system number 145, and a copy destination volume serial number 146.

The copy source storage system number 142 is the number designated to the storage system in which the volume represented by the copy source volume number 141 is included. The copy destination storage system number 145 is the number designated to the storage system in which the volume represented by the copy destination volume number 144 is included.

The volume serial numbers 143 and 146 are identifiers used in issuing of I/O by the host.

FIG. 5 is a configuration diagram of copy group association definition information according to the first embodiment.

The copy group association definition information 150 shows the relation between a copy group and an extended copy group. The copy group association definition information 150 contains an extended copy group number and the numbers designated to copy groups that are included in this extended copy group. To give a specific example referring to FIG. 10, a copy group numbered "01" and a copy group numbered "05" are included in an extended copy group numbered "01".

As has been described, each copy group is composed of volumes in two storage systems which form a pair and no volumes in storage systems on the same stage constitute a copy group. On the other hand, an extended copy group is an aggregation of copy groups and storage systems on the same stage (for example, storage systems on different transmission paths) can be included in one extended copy group.

FIG. 6 is a configuration diagram of a control I/O issuing parameter according to the first embodiment.

The control I/O issuing parameter 111 determines, for each extended copy group, the timing at which control I/O is issued, and shows second-long intervals at which the host computer 100 issues heartbeat I/O. The control I/O issuing parameter 111 can be inputted from the host computer SVP 120 or from the secondary host computer SVP 220 via a not-shown network, and may be set upon reception of information transferred from other devices.

FIG. 7 is a configuration diagram of storage system configuration information according to the first embodiment.

The storage system configuration information 160 determines the storage system configuration for each site. Specifically, recorded in the storage system configuration information 160 are the followings. A storage system having a system number "1" and a storage system having a system number "2" are set up in the primary site. The storage system having a system number "1" contains a volume having a volume number "01", a volume having a volume number "02", and a volume having a volume number "03". Volume serial numbers of the respective volumes are recorded in the storage system configuration information 160. Similar information on other sites, storage systems, and volumes is also recorded in the storage system configuration information 160.

Figure 8:
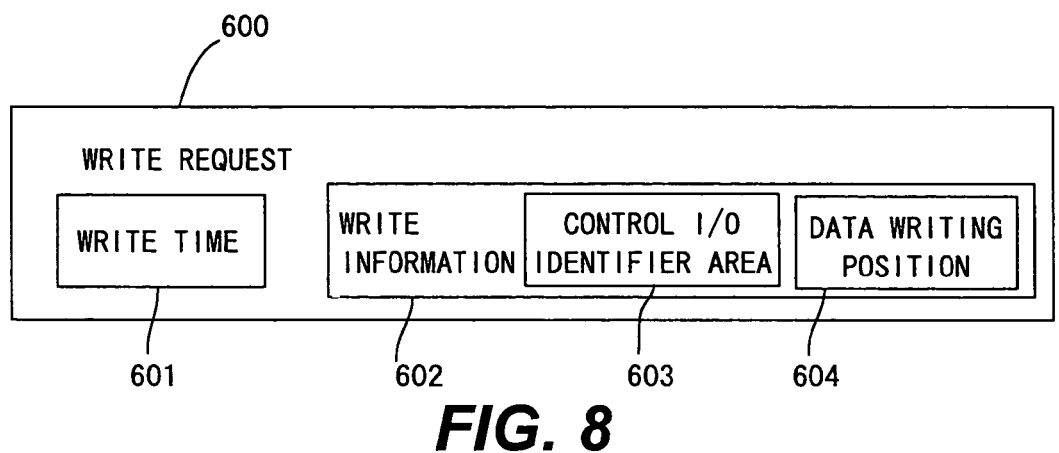
FIG. 8 is a configuration diagram of a write request according to the first embodiment of this invention.

FIG. 8 is a configuration diagram of I/O issued by the host computer 100 according to the first embodiment.

The host computer 100 issues a write request 600 to the storage systems 300 and 350. The write request 600 contains write time 601 and write information 602.

The write time 601 is a time stamp indicating the time when the host computer 100 issues this particular write request 600, and is stamped as the host computer 100 issues the write request 600 to the storage system 300 or other storage systems. The write information 602 is composed of the very data that is to be written in the storage system 300 (or others), the length of the data to be written, and the volume number and address of the volume in which the data is to be written.

The write information 602 also has a control I/O identifier area 603 to store an identifier that is used in judging whether this write request 600 is control I/O or not. For instance, when "0" is stored in the control I/O identifier area 603, the write request 600 is a normal I/O. When other value than "0" is stored in the control I/O identifier area 603, the write request 600 is a control I/O. When the write request 600 is control I/O, a number can be picked from sequence numbers 1 through 5 in order each time control I/O is issued, to be stored in the control I/O identifier area 603 (round robin).

The write information 602 also contains a data write position 604 to indicate in which address of which volume the write request is to be written.

The host computer 100 issues the write request 600 and sends the write request 600 to the storage system 300 or other storage systems. A write request that is control I/O is an I/O issued, not to store write data in a volume 321 or other volumes, but to detect a failure in the storage systems 400 and 450 and other storage systems in local site. Therefore, the write information 602 of a write request that is control I/O is dummy data except data in the control I/O identifier area 603. The unnecessary information including the data write position 604 can be omitted from control I/O in the first embodiment. Control I/O is a dummy write request, so to speak.

Alternatively, control I/O may contain data that is actually written in a storage system, so that data writing and failure detection are achieved at the same time.

FIG. 9 is a block diagram showing the configuration of a storage system according to the first embodiment. The configuration of the storage system 400 which is taken as an example in FIG. 9 is shared with other storage systems 300, 350, 450, 500, and 550.

The storage system 400 is provided with a storage control unit 410 and a disk array 420.

The storage control unit 410 is provided with a CPU, a memory, and an interface. The memory stores a control program, which is executed by the CPU to control data input/output for the disk array 420 upon request from the host computer 100 or other computers or from other storage systems. The memory has a cache which temporarily stores data inputted to or outputted from the disk array 420.

The storage control unit 410 has a primary write request receiving program 411, an update data sending program 412, a primary update data storing unit 413, and a secondary volume association table 414. The primary write request receiving program 411 operate when the storage system 400 is a copy source.

Figure 12:
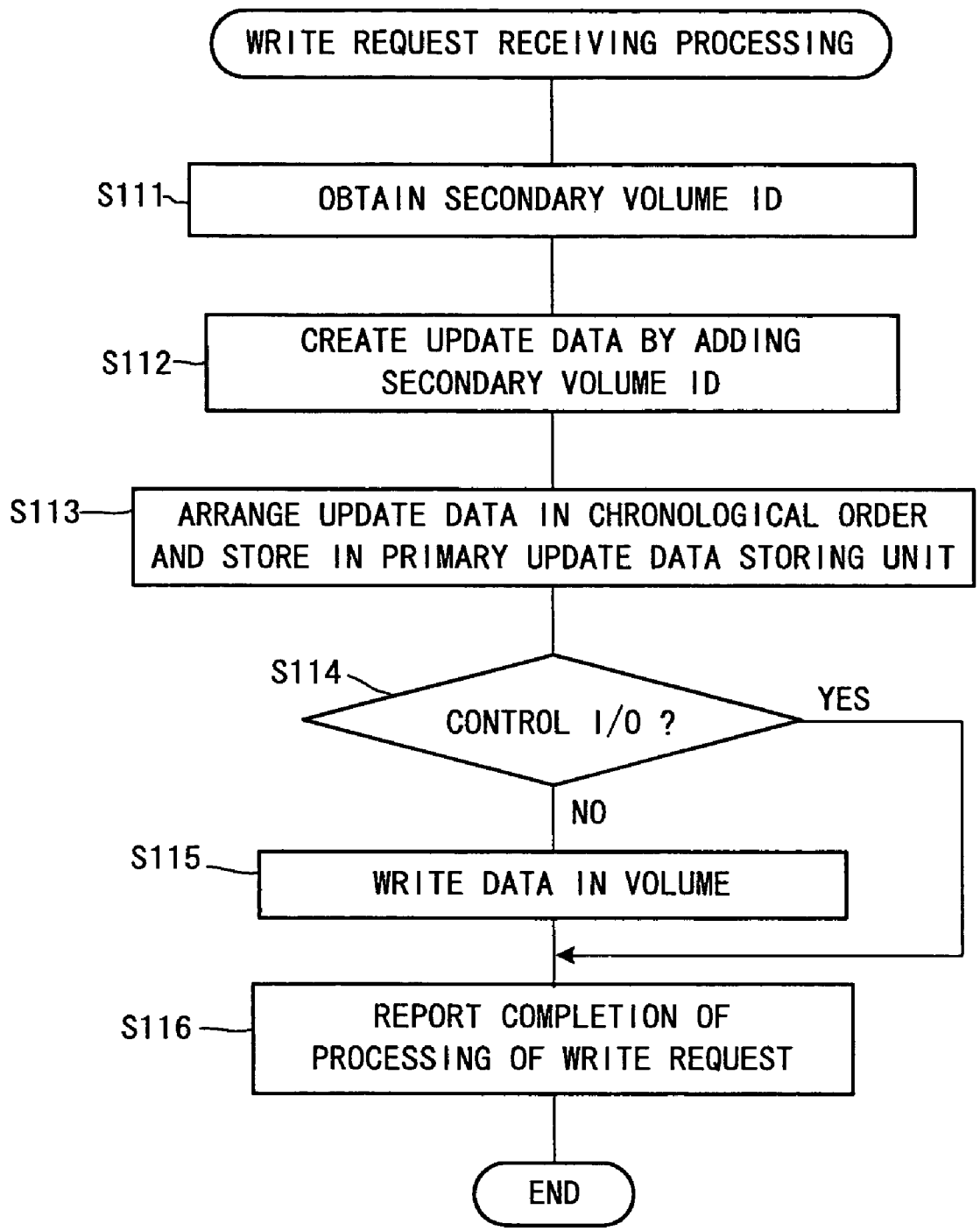
FIG. 12 is a flow chart of write request receiving processing according to the first embodiment of this invention.

The primary write request receiving program 411 is executed by the CPU to perform write request receiving processing, which is to receive a write request issued by the host computer 100 and which is shown in FIG. 12. The primary write request receiving program 411 is put into operation when the storage system is set up in the primary site and connected directly to the host computer (in the case of the storage systems 300 and 350).

The update data sending program 412 is executed by the CPU to send, when a volume from which data is to be remote-copied is in the storage system 400, update data stored in the primary update data storing unit 413 to the storage system 500, which is a copy destination, in an order of old write time 601 included in update data (in the order in which the write request 600 is issued). Update data here is information obtained by adding the secondary volume ID of the copy destination to the write request 600 that the storage system 300 receives from the host (S112 of FIG. 12).

The primary update data storing unit 413 stores update data reflected on the volume or update data created from a received write command in an order of old write time 601 included in update data (in other words, in the order in which the write request 600 is issued).

The secondary volume association table 414 is provided to find out a copy destination storage system number that corresponds to a data write destination storage system number contained in the write information 602.

The storage control unit 410 also has an update data receiving program 415 which is put into operation when the storage system is a copy destination, a latest time reporting program 416, a secondary update data storing unit 417, and an update data reflecting program 418. The programs 415, 416, and 418 are executed by the CPU.

The update data receiving program 415 stores update data in the secondary update data storing unit 417 in an order of old write time 601 included in update data (in other words, in the order in which the write request 600 is issued). Specifically, the program arranges update data sent from the storage system 300, which is connected to the storage system 400 to operate as a copy source, in an order of old write time 601 included in update data, and stores the arranged data in the secondary update data storing unit 417. The program reports completion of the processing to the copy source storage system 300.

The latest time reporting program 416 receives an instruction from the update data reflection instructing program 211 to send the write time 601 of the latest update data among update data stored in the secondary update data storing unit 417 to the update data reflecting program 418.

The secondary update data storing unit 417 stores update data received from the copy source storage system 300 in an order of old write time 601 included in update data (in other words, in the order in which the write request 600 is issued).

The update data reflecting program 418 reflects to a volume update data stored in the secondary update data storing unit 417, those that have the write time 601 prior to a reference time designated by the update data reflection instructing program 211, and then deletes the reflected update data from the secondary update data storing unit 417.

As the host computer 100 issues the write request 600 to the storage system 300, the write time 601 and the write information 602 are extracted from the write request 600. The storage system 300 refers to the write time 601, and sorts plural write requests 600 chronologically. Even with plural host computers 100 provided, if common time information is used (by, for example, sharing a time server), the write request 600 issued from one host computer 100 and the write request 600 issued from another host computer 100 can be arranged in a chronological order.

The disk array 420 is composed of plural physical disk drives. A logical volume, which is a unit recognizable as a single disk by an OS, is set to each disk drive. The logical volumes constitute RAID (Redundant Array of Independent Disks), so that data can be read and written in plural disk drives simultaneously increasing the disk access speed and providing data redundancy. This makes it possible to avoid losing stored data when a failure occurs in some disk drives. Each logical volume may be a disk array (aggregation of plural disk drives) such as RAID, or may be a single disk drive, or may be a part of a single or plural disk drives.

The storage system 400 also has a maintenance terminal (SVP: service processor) 430.

Figure 10:
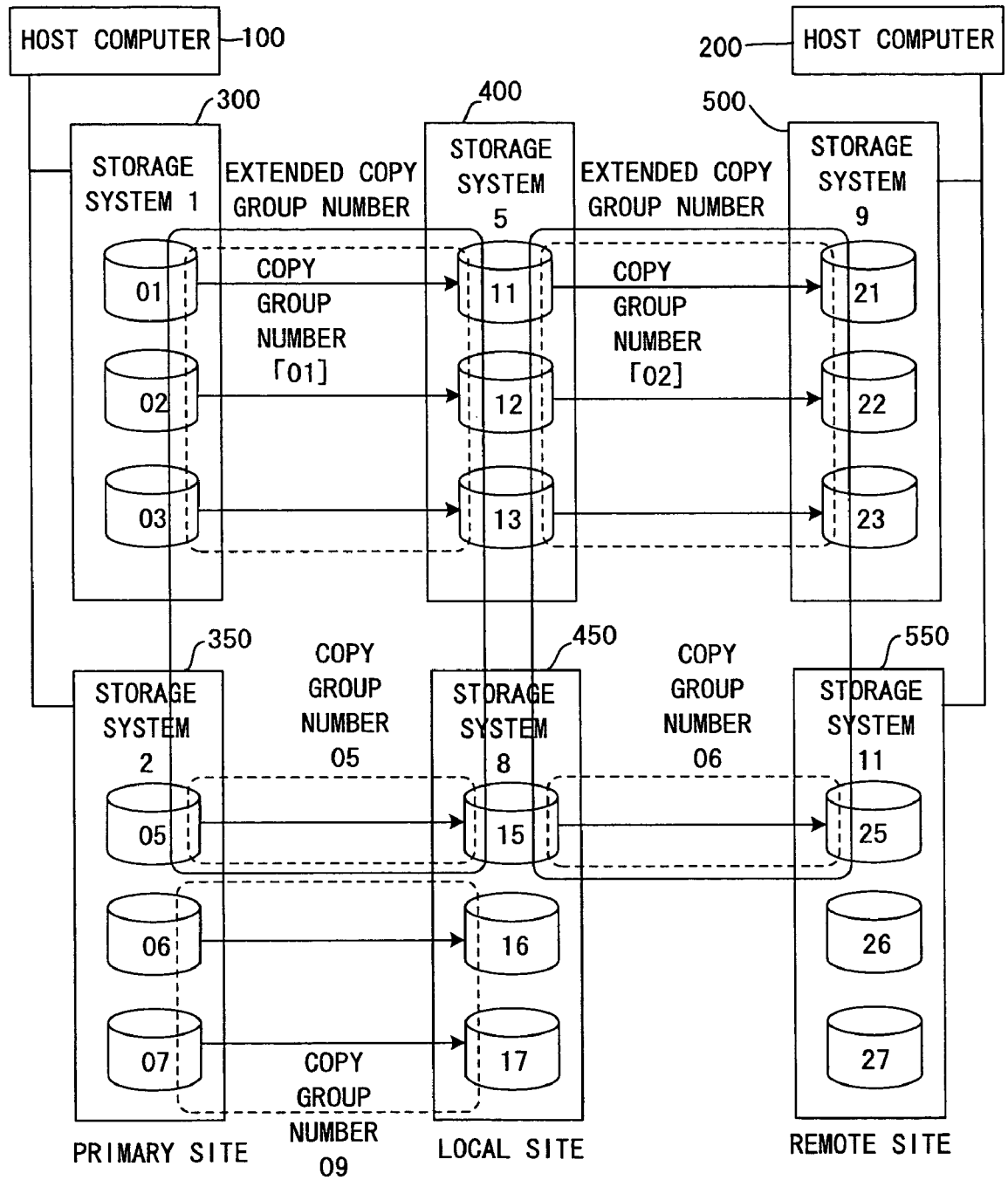
FIG. 10 is a schematic diagram of a copy group according to the first embodiment of this invention.

FIG. 10 is a schematic diagram of remote copy processing according to the first embodiment.

The storage system 300, which is in the primary site and which has a system number "1", is composed of the volume "01", the volume "02", and the volume "03". The storage system 400, which is in the local site and which has a system number "5", is composed of a volume "11", a volume "12" and a volume "13".

The volumes of the storage system 300 are respectively paired with the volumes of the storage system 400, and the volume pairs constitute a copy group "01". Data stored in the volumes "01", "02", and "03" are copied to the volumes "11", "12", and "13".

The storage system 350, which is in the primary site and which has a system number "2", is composed of a volume "05", a volume "06", and a volume "07". The storage system 450, which is in the local site and which has a system number "8", is composed of a volume "15", a volume "16", and a volume "17".

The volume "05" of the storage system 350 is paired with the volume "15" of the storage system 450, and the volume pair constitutes a copy group "05". The volumes "06" and "07" of the storage system 350 are paired with the volumes "16" and "17" of the storage system 450, respectively, and the volume pairs constitutes a copy group "09". Data stored in the volumes "05", "06", and "07" are copied to the volumes "15", "16", and "17" while the volumes belong to different copy groups.

Similarly, volumes of the storage systems 400 and 450 in the local site are paired with volumes of the storage systems 500 and 550 in the remote site, respectively, and the paired volumes constitute copy groups and extended copy groups.

Figure 11:
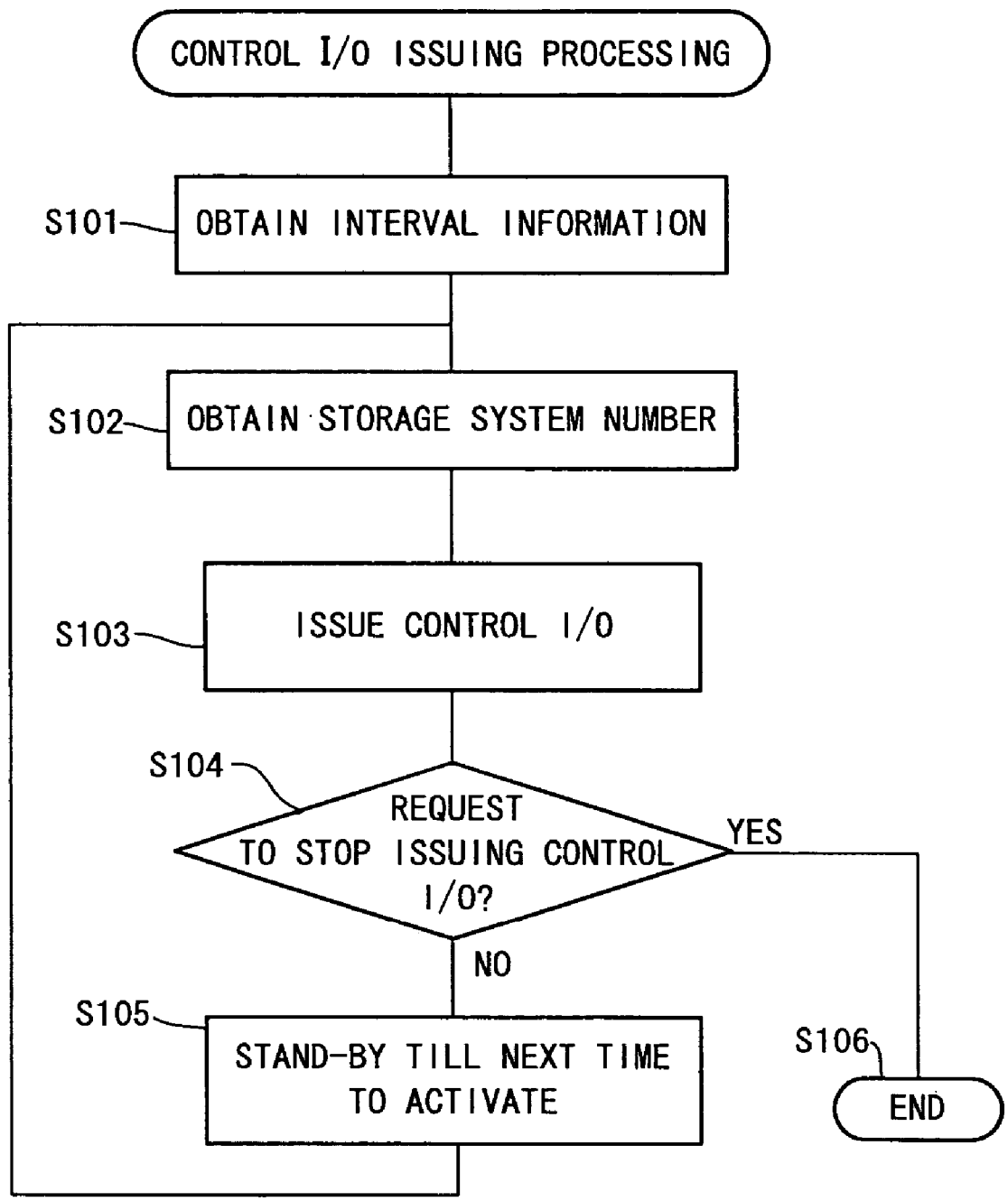
FIG. 11 is a flow chart of control I/O issuing processing according to the first embodiment of this invention.

FIG. 11 is a flow chart of control I/O issuing processing according to the first embodiment. The processing is executed by the control I/O issuing program 112.

First, the control I/O issuing parameter is issue interval information of a copy group to be processed are obtained, by referring to the control I/O issuing parameter (S101). Copy source storage system number and the copy destination storage system number for every pair that belongs to the copy group to be processed are obtained, by referring to the pair information 140 of the copy group association definition information 130 (S102). A volume written in the pair information 140 of the copy group definition information 130 is chosen for each storage system whose system number is obtained, and control I/O storing "0" in the control I/O identifier area 603 is issued to the chosen volume (S103).

Thereafter, a request to stop issuing control I/O is monitored (S104). In the case where a request to stop issuing control I/O which is inputted through the SVP 120 is received during this monitoring period, the processing is ended (S106). In the case where no request to stop issuing control I/O is received, on the other hand, the program enters a stand-by state to wait for the next time the control I/O issuing processing is to be activated and returns to step S102 (S105).

FIG. 12 is a flow chart of write request receiving processing according to the first embodiment. The processing is executed by the primary write request receiving program 411.

Upon receiving the write request 600 from the host computer 100, the program extracts the volume ID from the write information 602 in the received write request 600, and then refers to the secondary volume association table 414, and obtains the secondary volume ID that corresponds to the data write destination volume designated by the write information 602 (S111).

The obtained secondary volume ID is added to the write request 600 to create update data (S112). The created update data is arranged in an order of old write time 601 included in update data, and the arranged data is stored in the primary update data storing unit 413 (S113).

Next, whether the write request 600 is control I/O is judged (S114). When the control I/O identifier area 603 of the write request 600 stores a value other than "0", the write request is control I/O and therefore it is judged that there is no data to be written in a volume. The processing proceeds to step S116.

When the control I/O identifier area 603 of the write request 600 stores "0", the write request is not control I/O, but normal I/O and therefore data is written in the volume designated by the write request 600 (S115).

The program then reports completion of processing of the write request 600 to the host computer 100.

In this manner, the primary update data storing unit 413 stores update data corresponding to the write request 600 in the order in which the write request 600 is issued.

Figure 13:
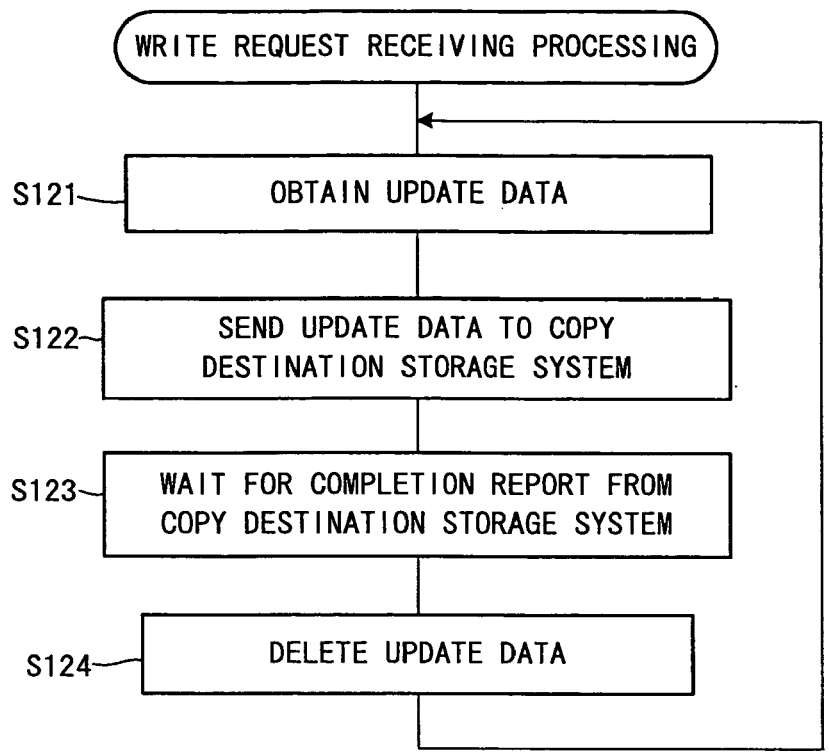
FIG. 13 is a flow chart of update data sending processing according to the first embodiment of this invention.

FIG. 13 is a flow chart of update data sending processing according to the first embodiment. The processing is executed by the update data sending program 412.

First, update data is read from the primary update data storing unit 413 in an order of old write time 601 included in update data (S121). The read update data is sent to a copy destination storage system connected (S122). The program then waits for a completion report from the copy destination storage system (S123). Upon receiving the completion report from the copy destination storage system, the program deletes the update data read from the primary update data storing unit 413 (S124), and the processing returns to step S121.

Update data stored in the primary update data storing unit 413 is thus sent to a copy destination secondary storage system in an order of old write time 601 included in update data (in other words, in the order in which the write request 600 is issued).

Figure 14:
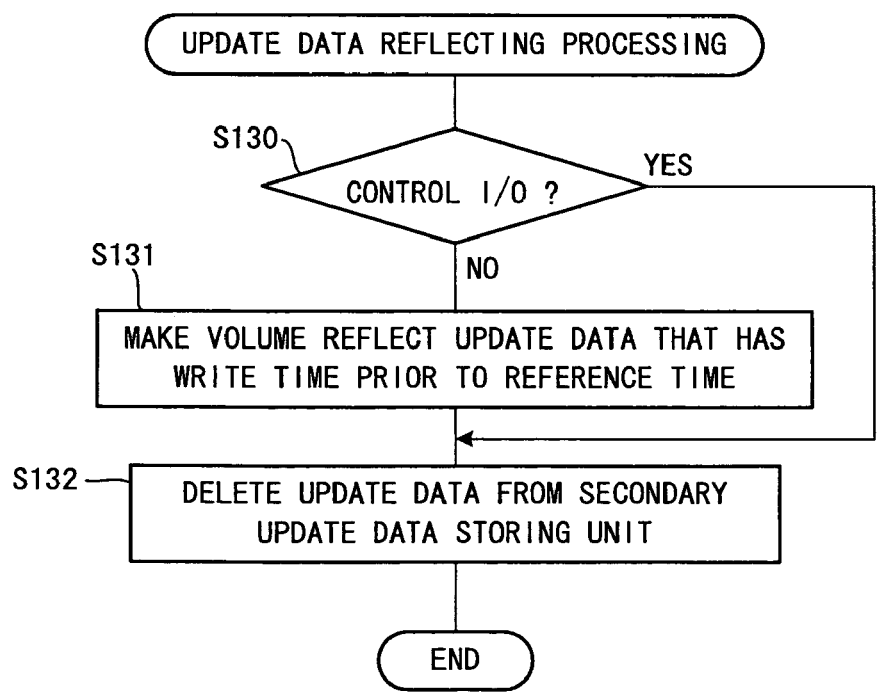
FIG. 14 is a flow chart of update data reflecting processing according to the first embodiment of this invention.

FIG. 14 is a flow chart of update data reflecting processing according to the first embodiment. The processing is executed by the update data reflecting program 418.

In the update data reflecting processing, the program refers to the control I/O area 603 of the update data stored in the secondary update data storing unit 417, and judges whether the data is control I/O or not (S130). When it is judged as a result that the data is control I/O, the update data is not reflected on the volume. On the other hand, when it is judged that the data is not control I/O, the program reflects to the volume update data that has the write time 601 prior to a designated reference time (S131).

The update data reflected on the volume in step S131 is deleted from the secondary update data storing unit 417 (S132).

Figure 15:
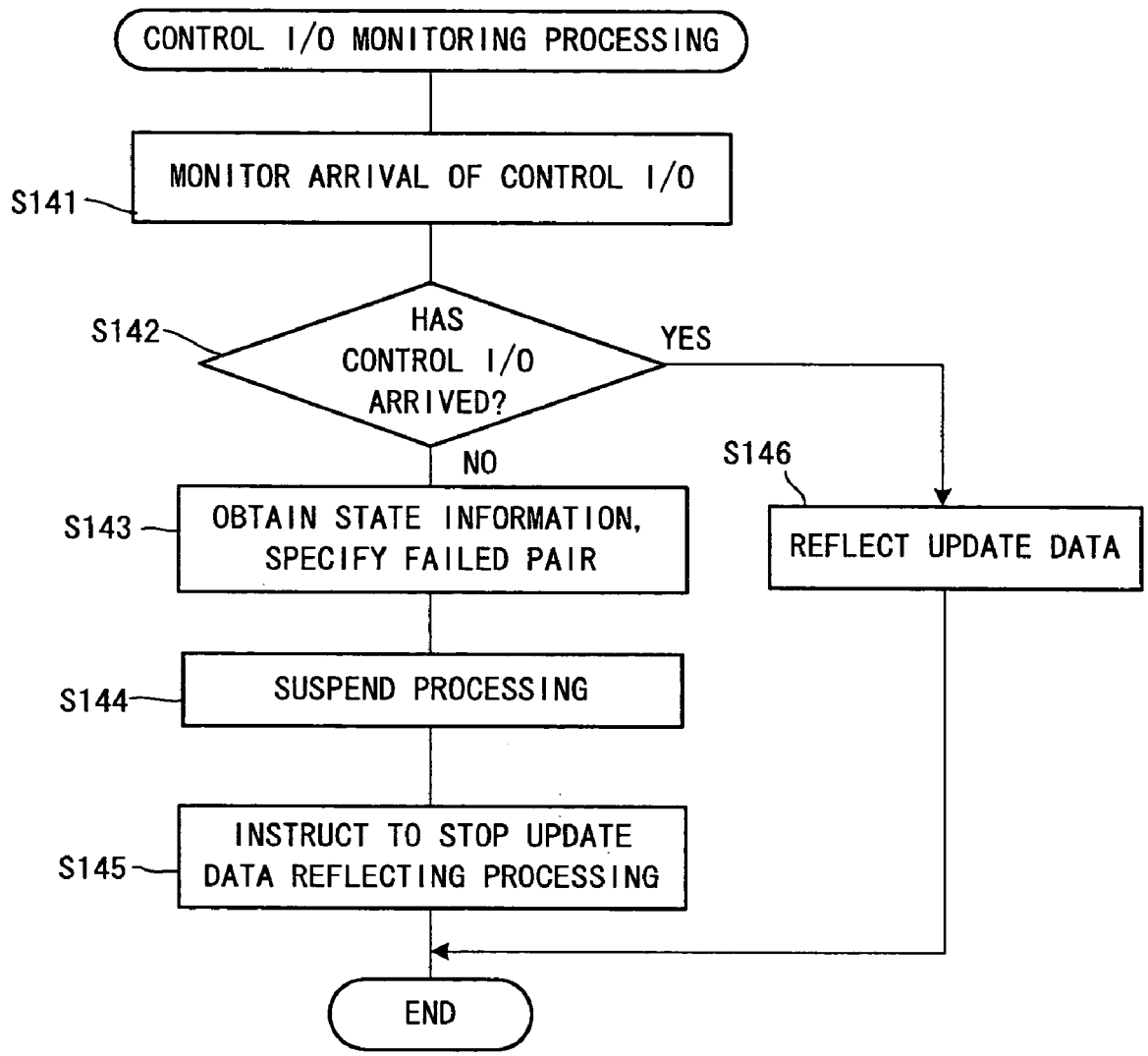
FIG. 15 is a flow chart of control I/O monitoring processing according to the first embodiment of this invention.

FIG. 15 is a flow chart of control I/O monitoring processing according to the first embodiment. The processing is executed by the control I/O monitoring program 212.

First, the program monitors each disk in a group obtained from the copy group definition information 130 for the arrival of control I/O (S141). When control I/O has arrived at every disk in the group, the program reflects to the volume update data (S146).

On the other hand, when control I/O fails to reach some disks in the group, the program asks for information on the state of a disk group on the transmission path of the control I/O that has not arrived, and obtains information on the state of corresponding storage systems to specify a failed pair (S143). Since each storage system holds information on the pair status (suspend or duplex) of storage systems to which it is connected, which storage system is suspended from a failure can be known by making an inquiry on the storage system pair status from lowest stage up. While making the inquiry for the failure location, a cause of the failure may be identified simultaneously.

Then information of other pairs in the group to which the pair in the failure location belongs is obtained, by referring to the copy group definition information 130, and the disks in the group are instructed to suspend (S144). The update data reflecting program 418 is instructed to stop the update data reflecting processing of the copy group (S145). Processing performed by storage systems on other transmission path which is associated with the storage systems in the failure location designated is thus stopped. Alternatively, data transmission/reception (data copying) between storage systems may be stopped without halting processing executed by the storage systems.

As has been described, with conventional remote copy, sending heartbeat signals at short intervals to storage systems to monitor the storage systems increases the load of the server that monitors the storage systems and delays normal I/O processing. This is particularly true in the case of cascade connection where storage systems are connected in stages as in the first embodiment, because every heartbeat signal passes through the storage systems 300 and 350 on the first stage causing the I/O load to concentrate on the storage systems 300 and 350. In other words, in prior art, even pair information (a pair is necessary for writing and reading in obtaining one piece of state information) of those beyond storage systems on the first stage is obtained through the storage systems on the first stage and therefore the I/O load concentrates on certain storage systems.

On the other hand, when the transmission interval of heartbeat signals is lengthened for reduction of a load by heartbeat signals, it could delay detection of a failure. In particular, in the case where plural storage systems are connected in parallel as in the first embodiment, a failure in some of storage systems cause a delay in suspending other storage systems while data copying is continued between storage systems that are not suspended, thereby breaking the data consistency.

The first embodiment achieves monitoring of storage systems for a failure while controlling the increase in load of storage systems 300 and others connected in a cascading manner by sending control I/O from the host computer 100 to the storage systems. The first embodiment is also capable of avoiding excessive accumulation of unupdated data (known as "dirty data") upon occurrence of a failure while keeping data consistency between storage systems of a copy pair.

Next, a second embodiment of this invention will be described.

A computer system of the second embodiment differs from the computer system of the first embodiment in that a volume of a storage system has a control I/O writing section. The components of the second embodiment that are same to those of the first embodiment are denoted by the same reference numerals and a detailed description of such components will be omitted.

Figure 16:
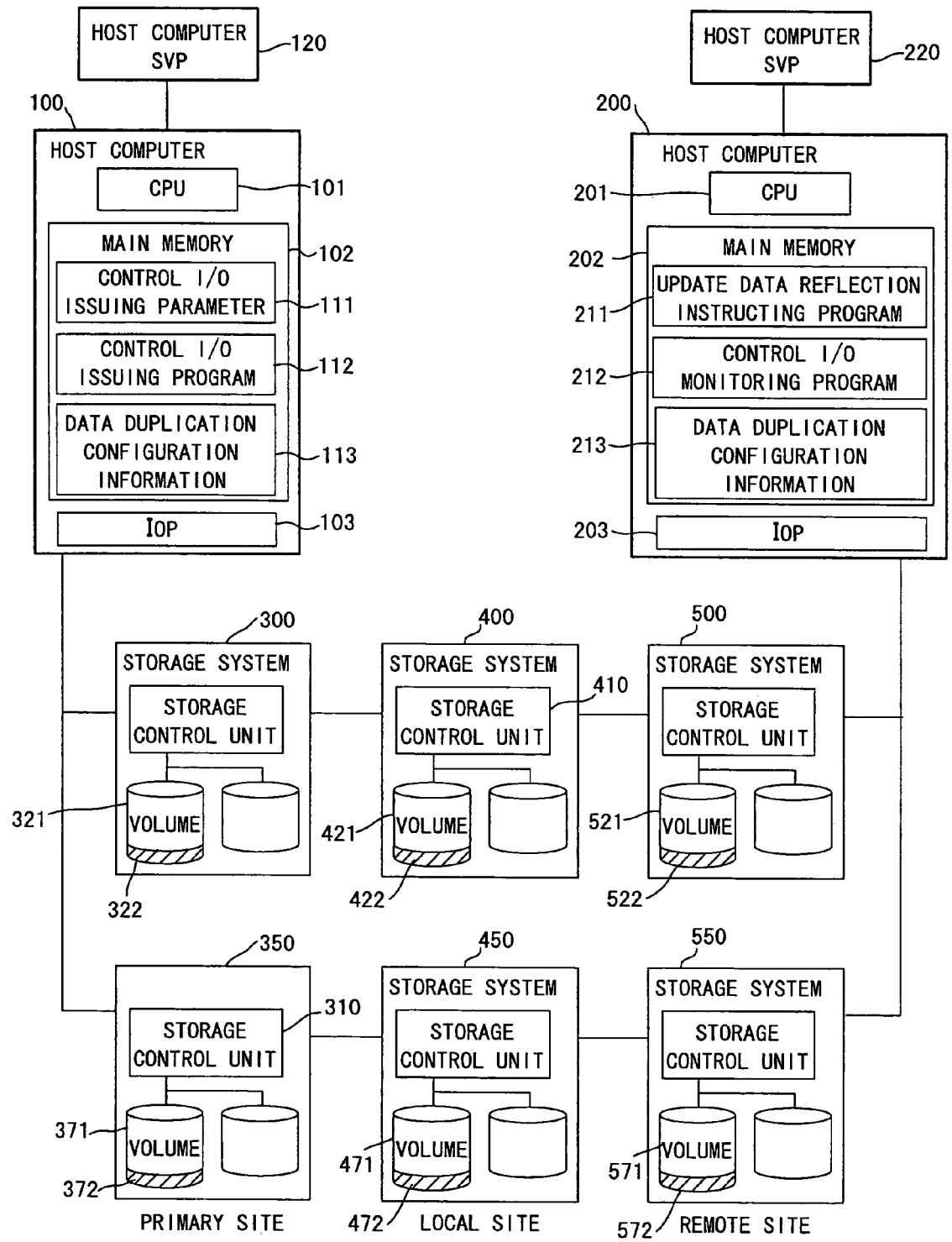
FIG. 16 is a block diagram a computer system according to a second embodiment of this invention.

FIG. 16 is a block diagram showing the configuration of the computer system according to the second embodiment.

In the second embodiment, a volume 321 of the storage system 300 has a control I/O writing section 322. Similarly, volumes in other storage systems have their own control I/O writing sections. It is not always necessary in the second embodiment to put a control I/O identifier area 603 in control I/O. A data writing position 604 shows the location of the control I/O writing section 322. Therefore, normal I/O and control I/O issued by a primary host computer 100 both have the same configuration of the write request 600 of the first embodiment which is shown in FIG. 8 without the control I/O identifier area 603.

The primary host computer 100 in the second embodiment issues control I/O to the storage system 300 as in the first embodiment. The difference is that the primary host computer 100 in the second embodiment issues control I/O which is a write request with the data writing position 604 set such that write data in the control I/O is stored in the control I/O writing section 322 inside the volume 321. Control I/O to be written in the control I/O writing section 322 only has to contain a write time 601 and a sequence number which makes the control I/O identifiable.

Accordingly, the storage system 300 does not execute the processing of judging whether update data is control I/O update data (S130 of FIG. 14) unlike the update data reflecting processing of the first embodiment. In other words, the storage system 300 refers to the data writing position 604 set in control I/O and stores the control I/O at the data writing position (control I/O writing section 322) in the volume which is indicated by the data writing position 604.

As described, in the second embodiment, control I/O sent from the host computer 100 and an upper stage storage system is written in a control I/O writing section 422. This eliminates the processing to sort received I/O into normal I/O and control I/O (step S114 of FIG. 12) and keeps down the increase in processing load of the storage system.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
a first storage system connected to a first computer used in normal operation,
a second storage system connected to the first storage system to store a copy of data stored in the first storage system,
a third storage system connected to the second storage system to store a copy of data stored in the second storage system,
a fourth storage system connected to the first computer used in normal operation,
a fifth storage system connected to the fourth storage system to store a copy of data stored in the fourth storage system,
a sixth storage system connected to the fifth storage system to store a copy of data stored in the fifth storage system,
a second computer connected to the third storage system and the sixth storage system,
a first transmission path extending from the first computer to the second computer through the first storage system, the second storage system, and the third storage system,
a second transmission path extending from the first computer to the second computer through the fourth storage system, the fifth storage system, and the sixth storage system,
wherein each of the first computer and the second computer having a memory, a control unit controlling data input/output in the storage systems by executing the control program, and an input/output processing device, the memory storing a control program, the control unit, the input/output processing device controlling to exchange data and control signals between the storage systems,
wherein the first computer sends control I/O on the first transmission path and the second transmission path,
wherein each of the storage systems transfers received control I/O to one of its connected storage system or the second computer, and
wherein the second computer:
monitors control I/O transferred on the first transmission path and the second transmission path,
requests state information of the storage systems on the transmission path that has failed to transfer the control I/O, and
requests shutting down to the storage systems on the other transmission path which are associated with the storage systems in a failure location specified based on the obtained state information.

2. The computer system comprising plural storage systems connected in stages between a first computer and a second computer, the first computer and the second computer each having a memory, a control unit, and an input/output processing device, the memory storing a control program, the control unit controlling data input/output in the storage systems by executing the control program, the input/output processing device controlling to exchange data and control signals between the storage systems, wherein
the first computer sends control I/O to the storage systems, and
the second computer:
monitors control I/O transferred through the storage systems, and
when there is control I/O that has not been transferred successfully, requests state information of the storage systems to transfer the control I/O,
wherein
a first transmission path on which the plural storage systems are connected in stages and a second transmission path on which the plural storage systems are connected in stages are provided between the first computer and the second computer,
each of the storage systems has a volume in which I/O sent from the first computer is written,
a copy source volume of the storage system which provides the copy data and a copy destination volume of the storage system which stores the copy data constitute a copy group, and
the control I/O is transferred on the transmission paths from the copy source volume to the copy destination volume including same copy group,
wherein the copy group contains plural source volumes and plural destination volumes,
the first computer sends control I/O to each of the plural copy source volumes, and
the second computer monitors the control I/O to find out whether the control I/O has arrived at each copy destination volume that belongs to the same copy group.

3. The computer system according to claim 2, wherein, when the control I/O has not arrived at one of the destination volume but arrived at another destination volume in the same copy group, the second computer requests state information from the storage systems on the transmission path of the control I/O that has not arrived successfully.

4. The computer system according to claim 3, wherein the second computer requests stopping copy processing to the storage systems on the other transmission path which are associated with the storage systems in a failure location specified based on the obtained state information.

5. The computer system according to claim 2, wherein each of the storage systems:
   has a volume in which I/O sent from the first computer is written
   when the I/O is normal I/O, reflects to the volume the received I/O, and transfer the I/O to storage system connected at a given timing, and
   when the I/O is control I/O, transfers the I/O to the connected storage system to the next stage or to the second computer without reflecting the I/O to the volume.

6. The computer system according to claim 2, wherein:
   each of the storage systems has a volume in which I/O sent from the first computer is written,
   the volume has a normal I/O writing section in which normal I/O is written and a control I/O writing section in which control I/O is written, and
   the first computer writes normal I/O in the normal I/O writing section and writes control I/O in the control I/O writing section.

7. The secondary host computer connected to a storage system on the final stage among plural storage systems which are connected in stages to a primary host computer, comprising:
   a memory storing a control program,
   a control unit which controls data input/output in the storage systems by executing the control program, and
   an input/output processing device which controls to exchange data and control signals between the storage systems;
   wherein monitor control I/O sent from the primary host computer and transferred by the storage systems; and
   when there is control I/O that has not been transferred successfully. request state information of the storage systems to transfer the control I/O,
   wherein a first transmission path and a second transmission path are provided between the primary host computer and the secondary host computer,
   the plural storage systems are connected in stages on each of the transmission paths,
   each of the storage systems has a volume in which I/O sent from the primary host computer is written,
   a copy source volume of the storage system which provides the copy data and a copy destination volume of the storage system which stores the copy data constitute a copy group, and
   the control I/O is transferred on the transmission paths from the copy source volume to the copy destination volume including same copy group,
   wherein the copy group contains plural source volumes and plural destination volumes, and
   the secondary host computer monitors control I/O sent by the primary host computer to find out whether the control I/O has arrived each copy destination volume that belongs to the same copy group.

8. The secondary host computer according to claim 7, wherein, when the control I/O has not arrived at one of the copy destination volume but arrived at another copy destination volume in the same copy group, state information is requested from the storage systems on the transmission path of the control I/O that has not arrived successfully.

9. The secondary host computer according to claim 8, wherein it is requested to stop copy processing to the storage systems on the other transmission path which are associated with the storage systems in a failure location specified based on the obtained state information.

* * * * *